United States Patent
Riederer

(10) Patent No.: US 10,334,225 B2
(45) Date of Patent: *Jun. 25, 2019

(54) STEREOSCOPIC CAMERA

(71) Applicant: Thomas Paul Riederer, Santa Barbara, CA (US)

(72) Inventor: Thomas Paul Riederer, Santa Barbara, CA (US)

(73) Assignee: TrueVision Systems, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/842,363

(22) Filed: Dec. 14, 2017

(65) Prior Publication Data

US 2018/0115765 A1 Apr. 26, 2018

Related U.S. Application Data

(60) Continuation of application No. 15/361,452, filed on Nov. 27, 2016, now Pat. No. 9,872,009, which is a
(Continued)

(51) Int. Cl.
*G02B 27/22* (2018.01)
*H04N 13/194* (2018.01)
(Continued)

(52) U.S. Cl.
CPC ......... *H04N 13/194* (2018.05); *H04N 13/133* (2018.05); *H04N 13/189* (2018.05);
(Continued)

(58) Field of Classification Search
CPC .. H04N 13/194; H04N 13/246; H04N 13/239; H04N 13/218; H04N 13/189; H04N 13/296; H04N 13/133; H04N 2213/001
See application file for complete search history.

(56) References Cited

U.S. PATENT DOCUMENTS

| 3,670,097 A | 6/1972 | Jones |
| 4,418,993 A | 12/1983 | Lipton |

(Continued)

FOREIGN PATENT DOCUMENTS

| EP | 1085769 A2 | 3/2001 |
| JP | H089421 A | 1/1996 |

(Continued)

*Primary Examiner* — Howard D Brown, Jr.
(74) *Attorney, Agent, or Firm* — K&L Gates LLP; Louis C. Cullman; Dennis A. Majewski

(57) ABSTRACT

Embodiments of a stereoscopic camera for acquiring, storing, transmitting and displaying stereoscopic images are disclosed. Some of the benefits of embodiments of this stereoscopic camera include converging optical axes, simultaneous left/right view data generation, transmitting and displaying stereoscopic images, stereoscopic digital zooming wherein a subset of pixels is displayed, pan-tilt-zooming of the stereoscopic camera, and interactive adjustment of images. Embodiments of the disclosed stereoscopic camera are capable of producing real-time, stereoscopic image data from locations or objects therein, in association with coordinate systems. Other embodiments include stereomicroscopes.

25 Claims, 2 Drawing Sheets

Related U.S. Application Data continuation of application No. 15/055,626, filed on Feb. 28, 2016, now Pat. No. 9,509,975, which is a continuation of application No. 14/740,110, filed on Jun. 15, 2015, now Pat. No. 9,277,203, which is a continuation of application No. 13/694,782, filed on Jan. 3, 2013, now Pat. No. 9,124,877, which is a division of application No. 11/881,617, filed on Jul. 24, 2007, now Pat. No. 8,390,675, which is a continuation-in-part of application No. 11/256,497, filed on Oct. 21, 2005.

(60) Provisional application No. 60/833,117, filed on Jul. 24, 2006, provisional application No. 60/621,271, filed on Oct. 21, 2004.

(51) Int. Cl.
*H04N 13/133* (2018.01)
*H04N 13/189* (2018.01)
*H04N 13/218* (2018.01)
*H04N 13/296* (2018.01)
*H04N 13/246* (2018.01)
*H04N 13/239* (2018.01)

(52) U.S. Cl.
CPC ......... *H04N 13/218* (2018.05); *H04N 13/239* (2018.05); *H04N 13/246* (2018.05); *H04N 13/296* (2018.05); *H04N 2213/001* (2013.01)

(56) References Cited

U.S. PATENT DOCUMENTS

| | | |
|---|---|---|
| 5,222,477 A | 6/1993 | Lia |
| 5,532,777 A | 7/1996 | Zanen |
| 5,546,120 A | 8/1996 | Miller |
| 5,720,706 A | 2/1998 | Takahashi |
| 5,825,532 A | 10/1998 | Mochizuki |
| 5,883,662 A | 3/1999 | Zanen |
| 5,914,810 A | 6/1999 | Watts |
| 5,963,369 A | 10/1999 | Steinthal |
| 6,111,598 A | 8/2000 | Faris |
| 6,177,952 B1 | 1/2001 | Tabata |
| 6,219,182 B1 | 4/2001 | McKinley |
| 6,262,743 B1 | 7/2001 | Allio |
| 6,624,935 B2 | 9/2003 | Weissman |
| 6,862,140 B2 | 3/2005 | Ogino |
| 6,864,910 B1 | 3/2005 | Ogino |
| 7,046,270 B2 | 5/2006 | Murata |
| 7,061,532 B2 | 6/2006 | Silverstein |
| 8,339,447 B2 | 12/2012 | Riederer |
| 8,358,330 B2 | 1/2013 | Riederer |
| 8,390,675 B1* | 3/2013 | Riederer ............ H04N 13/0246 348/158 |
| 9,124,877 B1* | 9/2015 | Riederer ............ H04N 13/245 |
| 9,277,203 B2 | 3/2016 | Riederer |
| 9,509,975 B2 | 11/2016 | Riederer |
| 9,872,009 B2 | 1/2018 | Riederer |
| 2003/0020807 A1 | 1/2003 | Khoshnevis |
| 2005/0207486 A1 | 9/2005 | Lee |
| 2006/0007301 A1 | 1/2006 | Cho |
| 2006/0023197 A1 | 2/2006 | Joel |
| 2007/0188603 A1 | 8/2007 | Riederer |
| 2008/0232680 A1 | 9/2008 | Berestov |
| 2012/0113509 A1* | 5/2012 | Yamada ............ G02B 27/2214 359/462 |
| 2012/0140044 A1* | 6/2012 | Galstian ............ A61B 1/00193 348/47 |
| 2012/0218387 A1* | 8/2012 | Aoki ...................... G03B 35/10 348/47 |
| 2012/0249748 A1* | 10/2012 | Nagano ................ G02B 27/123 348/47 |
| 2013/0050833 A1* | 2/2013 | Lewis ................ G06K 9/00604 359/630 |
| 2014/0267632 A1* | 9/2014 | Ward ..................... G02B 21/22 348/47 |

FOREIGN PATENT DOCUMENTS

| | | |
|---|---|---|
| JP | H0847001 A | 2/1996 |
| JP | 2010081580 A | 4/2010 |

* cited by examiner

STEREOSCOPIC CAMERA

CROSS-REFERENCE TO RELATED APPLICATIONS

This application is a continuation of U.S. patent application Ser. No. 15/361,452, filed on Nov. 27, 2016, now U.S. Pat. No. 9,872,009, which is a continuation of U.S. patent application Ser. No. 15/055,626, filed on Feb. 28, 2016, now U.S. Pat. No. 9,509,975, which is a continuation of U.S. patent application Ser. No. 14/740,110, filed on Jun. 15, 2015, now U.S. Pat. No. 9,277,203, which is a continuation of U.S. patent application Ser. No. 13/694,782, filed on Jan. 3, 2013, now U.S. Pat. No. 9,124,877, which is a divisional of U.S. patent application Ser. No. 11/881,617, filed on Jul. 24, 2007, now U.S. Pat. No. 8,390,675, which is a nonprovisional application of U.S. Provisional Patent Application No. 60/833,117 filed on Jul. 24, 2006, wherein U.S. patent application Ser. No. 11/881,617 is a continuation-in-part of U.S. patent application Ser. No. 11/256,497, filed on Oct. 21, 2005, which in turn is a nonprovisional application of U.S. Provisional Patent Application No. 60/621,271, filed on Oct. 21, 2004, wherein all of the U.S. priority applications in their entirety are herein incorporated by reference.

BACKGROUND

Description of Related Art

The use of stereoscopy, in which the user sees left- and right-eye views and forms a three dimensional image through stereopsis, is common in many areas of science, medicine and entertainment. The use of an optical instrument to provide a stereoscopic image of objects to a user's eyes is also common. Optical instruments are used for observation, surveillance, and many other purposes.

The optical image generated by an optical instrument is typically viewed through eyepieces. However, the use of eyepieces in optical instrument systems is often problematic. Furthermore, only one observer at a time can view images generated by the optical instrument and the observer can no longer see what is happening in the surrounding environment. In addition, an optical instrument, as such, cannot store images or sequences of images for later playback, process them in special ways, or transmit them to remote viewing sites. There are also situations in which it is desirable to remotely view or record a stereoscopic image of a location or object without involving a person to take the image.

Therefore, it is often desirable to use electronic imaging to acquire images of a location, either for direct, real-time observing or for recording Electronic imaging is a preferred method of the television broadcasting, video and movie industries as well. The use of cameras and electronic displays to acquire images is well known in the art, including the use of two cameras and a 3D display to give a stereoscopic image.

However the two-camera systems have many disadvantages. Obtaining and maintaining stereoscopic alignment (necessary for comfortable, long-term viewing) can be very difficult when two independent cameras are mounted on or comprise an optical instrument. The cameras generally protrude from the general body of the device and are often mounted in a way that is fragile and prone to breakage. Protruding cameras can also interfere with other apparatuses in the workspace, limiting possible usage configurations. The two-camera systems have generally double the optical instrument and camera knobs and controls, resulting in an unwieldy device difficult to operate by a single user. Dual camera systems generally require numerous mounting parts, resulting in less reliability and more cost than a single, integrated camera.

There are also problems with mounting and connecting the cameras to displays or storage media. The use of two cameras requires multiple cables and connectors, resulting in less reliability and more difficult installation than a single cable/connector arrangement of the present invention. The two-camera system also typically requires two camera control units (CCUs) and two storage devices, and requires that they be synchronized for best image quality. This significantly increases the cost of the system.

In addition, such cameras do not allow precise positioning of the imaging sensors to each other for best stereopsis and comfortable viewing, particularly when two off-the-shelf cameras are used. Cameras which are wide cannot be easily positioned side-by-side with close spacing. The cameras must be individually focused after mounting, and, should adjustments such as brightness and contrast be needed, each camera must be controlled individually. Where the cameras contain irises, they must also be individually adjusted for each camera, resulting in the potential for unequal amounts of light entering each camera, which can lead to difficult 3D viewing and eyestrain. All these factors indicate that using such a system requires skill and can be very time-consuming.

Image processing is also problematic in such systems. The cameras must be electronically linked in some way so that the two image streams are synchronized, creating additional cost and complexity. Even if the data streams are synchronized, generally the shutters are not perfectly synchronized such that the nth pixel from one view was not captured at the same time as the nth pixel from the other view, causing moving objects to show spurious parallax when displayed. Furthermore, the images acquired by the two cameras are generally taken directly to the 3D display device. Therefore, should the user require image processing, storage, transmission, or display on alternative displays, additional processing units are required, creating additional cost and complexity.

The cameras used in such two-camera systems also usually conform to the NTSC or PAL video standard, both of which suffer from low resolution, poor color fidelity, and motion artifacts (due to the interlaced nature of the raster scan). Recording and editing recorded content is also problematic with the two-camera system. Recorders don't generally start and end synchronously, so the two tapes or files must somehow be synchronized, resulting in additional effort and expense. Editing may need to be performed twice—once to each file or tape.

Information relevant to attempts to address these problems can be found in U.S. Pat. Nos. 4,418,993; 4,583,117; 4,879,596; 4,881,122; 5,164,827; 5,438,386; 6,157,337, and 6,512,892.

However, each one of these references suffers from one or more of the following disadvantages: the device or system creates two independent output signals; is not compact; does not provide sufficient image processing, recording, or transmission capability; does not have adequate resolution in real-time for many applications; is cumbersome or is not easily operated by a single user; is large and expensive; more than one operator is generally needed to properly control all of the required functions in order to provide good images; it is difficult to synchronize two separate cameras to the pixel level; two recording devices or image-capturing paths are required, resulting in additional complexity and cost in acquiring and recording the images and editing them as is often desirable; accessory image/data recording systems have a required start-up time prior to recording; uses significant power, requiring large batteries for mobile applications and emitting significant heat that could disturb sensitive environments; is more fragile than a single camera; or does not perform well if either or both of the cameras uses automatic focusing, automatic exposure control or image stabilization control, because such systems or devices heretofore have not been synchronized for the two views from the two cameras;

Therefore, the use of optical instrument systems containing electronic cameras, recording devices and display therefore solves some of the eyepiece problems but creates new ones, essentially making them impractical for routine use.

SUMMARY

Embodiments of the present invention provide improved devices and methods for viewing and recording images and, in particular, stereoscopic images.

The embodiments of the invention relate to a compact stereoscopic camera capable of providing visual observation and recording of images of a location. In particular, embodiments of the present invention provide an optical instrument having an integrated Stereoscopic Image Acquisition Device (SIAD) which circumvents the need for, and limitations of, eyepieces. The camera acquires and transfers high-resolution, real-time stereoscopic image data in a single data stream, from stereoscopic still or moving views of a location or object synchronized to the pixel level, to image processing, recording, or display systems which may be included in an integrated handheld device. The device performs the desired functions without protruding elements, numerous cables and connectors, and other additional components, and could be readily operated by a single user.

One aspect of the invention is a stereoscopic camera having an optical instrument and a stereoscopic image acquisition device. In one embodiment, the camera contains mechanisms or structures designed to avoid spurious parallax. In another embodiment, the camera contains mechanisms or structures designed to control the effect of varying interpupillary distance (IPD). In yet another embodiment, the camera contains mechanisms or structures designed to control the effects of varying convergence. In a further embodiment, the camera can provide a non-reflected view or desirable orientation of the location. In another embodiment, the camera contains master-slave control of adjustable channels. In yet another embodiment, the camera may be free standing and contains an integrated power source, image processing unit, and storage device. In yet another embodiment, a display mechanism is integrated into the camera.

A second aspect of the invention is a stereoscopic camera including master-slave control of adjustable camera channels such that aspects of the views from channels are equalized, providing optimal stereopsis.

A third aspect of the invention is a method for acquiring stereoscopic images of a location or object, the method including steps for interactively aligning vergence without producing substantially abrupt transitions in the views used to acquire the stereoscopic images. In one embodiment, alignment could be achieved by a single user. In another embodiment, alignment could be achieved simultaneously with other camera adjustments. In yet another embodiment, the method includes processes for maintaining vertical position equalization in order to prevent spurious parallax between the respective views.

A fourth aspect of the invention is a stereoscopic camera in which the functional elements of an optical instrument and a stereoscopic image acquisition device are integrated into a single package.

A fifth aspect of the invention is an interactive method for mitigating the effects of camera shake while acquiring stereoscopic images.

These and other further features and advantages of the embodiments of the invention will be apparent to those skilled in the art from the following detailed description, taken together with the attached drawings.

DETAILED DESCRIPTION OF THE INVENTION

Figure 1:
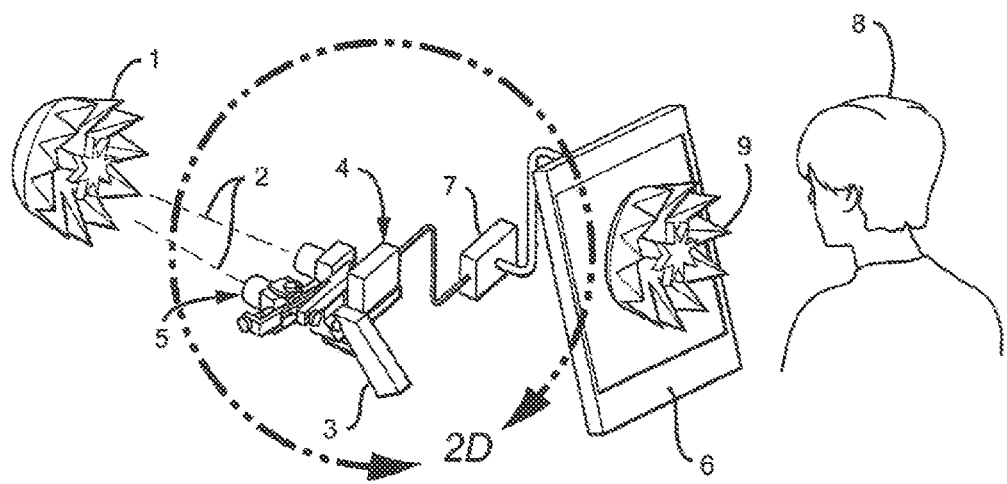
FIG. 1 is a perspective view of one embodiment of the invention having a stereoscopic camera system, including the system components and a viewer.

Embodiments of the present invention provides improved devices and methods for acquiring, viewing and recording images and, in particular, stereoscopic images.

Briefly, and in general terms, embodiments of the present invention are directed to an optical instrument having an integrated SIAD device. In particular, embodiments of the present invention provide an optical instrument having an integrated SIAD device which circumvents the need for, and limitations of, eyepieces, and additionally includes numerous features not hitherto associated with optical instruments.

In particular, embodiments of the present invention relate to a compact stereoscopic camera capable of providing visual observation of a location. In particular, some embodiments of the present invention provide an optical instrument having an integrated Stereoscopic Image Acquisition Device (SIAD) which circumvents the need for, and limitations of, eyepieces. The camera acquires and transfers high-resolution, real-time stereoscopic image data in a single data stream, from stereoscopic still or moving views of a location or object synchronized to the pixel level, to image processing, recording, or display systems which may be included in an integrated handheld device. The device performs the desired functions without protruding elements, numerous cables and connectors, and other additional components, and could be readily operated by a single user.

The following description presents embodiments of the invention representing the modes contemplated for practicing the methods disclosed, including the best mode. This description is not to be taken in a limiting sense but is made merely for the purpose of describing the general principles of the embodiments of the invention whose scope is defined by the appended claims.

Before addressing details of embodiments described below, some terms are defined or clarified. As used herein, the terms "comprises," "comprising," "includes," "including," "has," "having" or any other variation thereof, are intended to cover a non-exclusive inclusion. For example, a , method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the embodiments of the invention. This is done merely for convenience and to give a general sense of the embodiments of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Furthermore, any definitions used refer to the particular embodiments described herein and are not to be taken as limiting; the invention includes equivalents for other undescribed embodiments. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

As used herein, the term "beam" is intended to mean a rigid member or structure supported at one or both ends, subject to bending forces from a direction perpendicular to its length. A beam can be made flexible in a direction and rigid in others.

As used herein, the term "binocular" is intended to mean an optical instrument consisting of two optical paths, each comprising one or more optical components, such as a lens, or combination thereof for focusing a stereoscopic image of a location or object therein on, for example, the eyes of a viewer or on a sensor. A binocular can be used for magnifying a small distant object but can also be used to provide a de-magnified view of a location, for example a wide-angle stereoscopic image of a landscape location. By comparison, a microscope generally is used for magnification of small objects which are close and held attached to a stationary portion of the microscope to which the optical path is focused. A binocular is generally used to observe objects at more varying, farther and random distances.

As used herein, the term "camera" is intended to mean a device that consists of one or more lightproof chambers with one or more apertures fitted with one or more in combination lens or other optical component through which the image of an object is projected and focused onto a surface for recording (as on film, for example) or for translation into electrical impulses or data, for display or recording (as for television broadcast, for example).

As used herein, the term "camera shake" is intended to mean the effect of unintended vibration and random motion imparted to a camera by the unsteadiness of the holding device, which is generally a user's hands, a vehicle's mounting bracket or an unsteady base. Camera shake appears on a display as a bouncing or vibrating view.

As used herein, the term "centration" is intended to mean the accuracy with which the optical axis of a lens in an optical instrument coincides with the mechanical axis of a mounting in the instrument for that lens. Poor centration can cause spurious parallax when optical components are moved relative to one another or to a sensor.

As used herein the term "channel" when referring to a stereoscopic camera is intended to mean the components required to acquire a view of a stereoscopic image. One nonlimiting example of a channel consists of a lens, optical path and one or more sensors to acquire the view as data. Channels are typically arranged such that the optical axes are coplanar and may converge at a distant point, and the input optical components are generally side by side.

As used herein the term "channel spacing" or "spacing of channels" refers to the distance between the optical paths at the inputs to the input optical components of channels, often objective lenses. Channel spacing may be adjusted in order to change one or more of the views of a location or object, thereby providing a desired perspective of the stereoscopic image formed by the views.

As used herein, the term "controller" is intended to mean the component of a system that contains the circuitry necessary to interpret and execute instructions fed into the system. For example an acquisition system may contain an acquisition controller. Representative graphics controllers include without limitation a graphics card, video card, video board, video display board, display adapter, video adapter, graphics adapter, image processing unit or combination thereof.

As used herein, the term "de-reflection" refers to reversing the reflecting effect of a deflecting element. If a mirror or other deflecting element is used between the object and a camera, for example to look around a corner, the view can be reversed electronically by reassigning the location of pixels within the views such that the view presented on the display is oriented as if the object was viewed directly.

As used herein, the term "electronic mechanisms for adjusting the size of an object" include automatic zoom and digital zoom.

As used herein, the term "equalize" or "equalized" is intended to mean to cause to correspond, or be like, in amount or degree as compared, including without limitation to make equal or to compensate for differences.

As used herein, the term "equalization of size" refers to having an object appear at the appropriate size to each eye of the viewer. Generally for objects in front of a viewer an object will appear the same size in each eye. As such, in a stereoscopic image it is important that an object appear the same size in each view in order for the viewer to form the best stereopsis. If the object does not appear to be the same size, the size can be equalized by making the size of one view equal to that of the other view of the object to correct the image.

As used herein, the term "equalization of vertical position", vertical referring to the direction perpendicular to the plane of the optical axes of two channels of a stereoscopic camera, refers to making an object appear at the appropriate vertical position to each eye of the viewer. Generally a point on an object is at the same vertical position in each view to avoid spurious parallax which detriments the viewer's stereopsis. If the object does not appear to be at the same vertical position, the position can be equalized by making the position of one view equal to that of the other view of the object to correct the image.

As used herein, the term "free-standing" is intended to describe a device which is sufficiently complete in construction such that no additional devices are required for its operation. For example without limitation, a camcorder can be free-standing as it runs on batteries and has a built-in recording system; the user need have no other device to operate it.

As used herein, the term "high-resolution" when referring to stereoscopic images is intended to mean at least about 1280 by 720 pixels for each left or right view. It is contemplated that resolutions of three times and eight times this minimum resolution may be implemented depending on the state of technology for sensors and displays and depending on what cost is acceptable. On the other hand, the devices of the present invention may be implemented without limitation with higher or lower resolutions for either one or both of the views.

As used herein, the term "image data" is intended to mean data produced by regular array detectors such as CMOS, CCDs and infrared devices. The data structures are created by the data acquisition systems or acquisition controller for use by observers, data reduction systems, and archives.

As used herein the term "kinematic relationship" is intended to mean the ability to deduce the motion of points on a device from the knowledge of the motion of other points on the device and the geometry of the device. For example without limitation, if one end of a long lever is lifted, say, 2 inches, it can be deduced from the kinematic relationship that the motion of the midpoint of the lever is about 1 inch.

As used herein, the term "lens" is intended to refer to a piece of transparent material (such as, for example, glass) that has two opposite regular surfaces, either both curved or one curved and the other plane, and that is used either singly or combined in an optical instrument for forming an image by focusing rays of light. "Lens" may refer to an individual lens or a plurality of individual lenses acting in combination.

As used herein, the term "location" is intended to mean a position or site marked by some distinguishing feature, including without limitation a place, scene, or point therein.

As used herein, the term "magnification" is intended to mean the ratio of the size of an image to the size of an object. It can be a relative term because an electronic image of an object imaged with a camera could be displayed on a large or a small display device and hence have different magnifications resulting from identical image data.

As used herein, the term "mechanism" is intended to mean a process, technique, device or system for achieving a result. A mechanism may be controlled in a variety of ways, including without limitation mechanically, electromechanically, electrically, or electronically operated mechanisms.

As used herein, the term "optical" is intended to mean of or relating to or involving light or optics, including without limitation the use of visible radiation or combinations of visible and non-visible radiation to visualize objects.

As used herein, the term "optical component" is intended to mean a part of an optical system which deflects, refracts, restricts, focuses, manipulates, mirrors, modifies, filters or has some other intended effect on a beam of light including without limitation lenses, prisms, mirrors, and beamsplitters.

As used herein, the term "optical instrument" is intended to mean any optical instrument capable of generating images including without limitation microscopes, endoscopes, binoculars, and telescopes.

As used herein, the term "optical path" is intended to mean the generally central ray in an optical system. Should the system have no central ray then the optical path is the general centerline of the average of all the rays.

As used herein, the term "optical device" is intended to mean any device or instrument capable of generating, sensing, capturing, processing, formatting, or storing images or image data.

As used herein, the phrase "real time" is intended to mean that the image data is acquired, processed, transmitted, or displayed at a sufficiently high data rate and at a sufficiently low delay that objects on a display move smoothly, for example without user-noticeable judder or latency between object motion and display motion. Typically, this occurs when new images are acquired, processed, and transmitted at a rate of at least about 24 frames per second (fps) and displayed at a rate of at least about 45 fps and when the combined processing of the system has no more than about $1/30^{th}$ sec of delay.

As used herein, the phrase "single data stream" is intended to mean a combination of more than one individual data streams into a single stream such that a desirable aspect of the data is maintained, such as timing or scale.

As used herein, the term "sensor" is intended to mean a device that responds to a stimulus, such as heat, light, or pressure, and generates one or more signals that can be measured or interpreted.

As used herein, the term "shutter" is intended to mean a camera component that allows light to enter by opening and closing an aperture.

As used herein, the term "spurious parallax" is intended to mean the parallax between views in a stereoscopic image which appears imperfect to the viewer. Vertical parallax of even a small amount results in poor stereopsis. For example, spurious parallax can be caused by non-planar optical axes of channels, unequal magnification in channels, vibration of the camera, distorted or unequal optical paths of channels and similar imperfections.

As used herein, the term "stereoscopic image" is intended to mean a single image consisting of at least two views, one corresponding to a left-eye view, i.e. the left view, and one corresponding to a right-eye view, the right view.

As used herein, the term "stereoscopic image acquisition device" is intended to mean a device capable of acquiring stereoscopic images from an optical instrument, or the imaging components thereof. Embodiments of the device acquire and transfer high-resolution, real-time image data from stereoscopic still or moving images to image processing, recording, or display systems. Embodiments of the device can perform the desired functions without protruding elements, numerous cables and connectors, and other additional components such as eyepieces, and can be readily adapted for use with a variety of optical instruments. Embodiments of the device may incorporate the functionality of related mechanisms, controllers, sensors, and processors in a non-limiting manner.

As used herein, the term "telescope" is intended to mean an instrument designed for the observation of remote objects, typically comprising an input optical component at the distal end of a tube and one or more optical components at the proximal end, such tube providing a path for light beams and possibly a path to change the spacing of optical components and hence focus or magnification, including without limitation a tubular optical instrument for viewing distant objects by means of the refraction of light rays through a lens or the reflection of light rays by a concave mirror.

As used herein, the term "vergence" is intended to mean the ability of the optical axes of the eyes or of an optical instrument to rotate toward or away from each other to remain pointed at an object as it approaches or moves away.

As used herein, the term "view" is intended to mean extent or range of vision.

Attention is now directed to more specific details of embodiments that illustrate but not limit the invention.

General Description

One embodiment of the invention provides a stereoscopic camera that includes a Stereoscopic Image Acquisition Device (SIAD) having an acquisition controller and an optical instrument that may be attached to or built into the SIAD.

Figure 2:
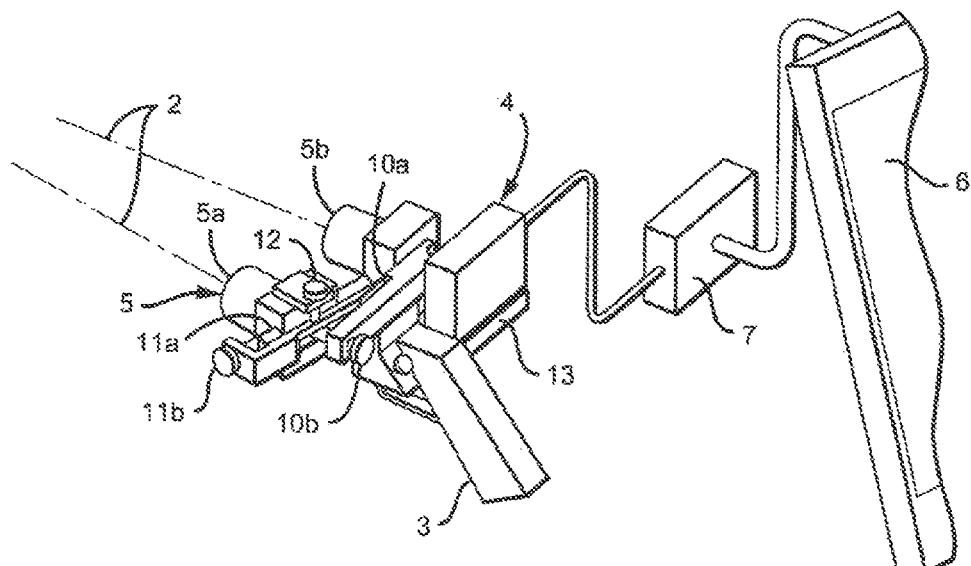
FIG. 2 is an expanded perspective view of the stereoscopic camera components of the embodiment shown in FIG. 1.
Figure 3:
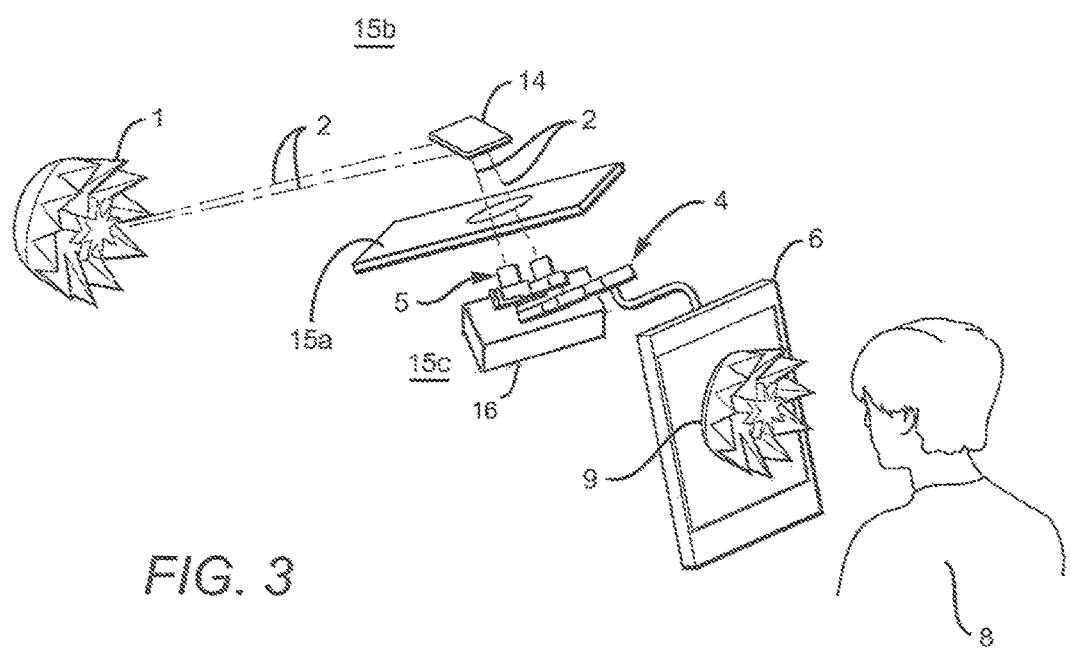
FIG. 3 is a perspective view of one embodiment of the invention containing a deflecting element in addition to stereoscopic camera system components and a viewer.

FIGS. 1-3 illustrate three embodiments of the invention having a variety of components and applications. FIG. 1 illustrates one embodiment of the Stereoscopic Camera and System and its components, and a viewer. The components are labeled as outlined below:

1. Object in a location being imaged;
2. Optical axes;
3. User interface, in this embodiment a pistol-grip with controls;
4. Stereoscopic Image Acquisition Device (SIAD);
5. Optical instrument, in this embodiment it is a binocular having two telescopes that is attached to the SIAD;
6. Stereoscopic display, in this embodiment an autostereoscopic flat panel;
7. Image processing unit (IPU), in this embodiment a display controller is included in the IPU;
8. Viewer, in approximate viewing position in this embodiment to see both object and 3D image; and
9. Image of object in location, appearing in 3D to the viewer.

FIG. 2 shows a close-up of several components of the embodiment shown in FIG. 1 which are labeled as outlined below:

2. Optical axes;
3. User interface, in this embodiment it is a pistol grip with trigger for image capture and thumb-operated joystick for other input functions;
4. Stereoscopic Image Acquisition Device. In this embodiment the connections (not shown) from sensors to acquisition controller are flexible circuits, allowing mutual movement between sensors and acquisition controller;
5. Optical instrument, in this embodiment is a binocular having two telescopes, (5a) and (5b) respectively;
6. Stereoscopic display, in this embodiment for images and user interface;
7. IPU; in this embodiment a display controller is included in the IPU;
10a and 10b. Means to adjust the convergence of the optical axes, in this embodiment it is a flexing beam (10a) with a manually-driven screw (10b);
11a and 11b. Means to adjust the interpupillary distance (IPD), in this embodiment it is a slider traveling on a rail (11a), controlled by an electromechanical actuator (11b);
12. Means to adjust the vertical alignment of the cameras' images, in this embodiment it is an actuator-driven screw; and
13. Battery pack.

Components

In one embodiment, the invention provides a stereoscopic camera system that includes a Stereoscopic Image Acquisition Device 4 (SIAD), an optical instrument 5 that may be attached to or built into the SIAD, and a display mechanisms for displaying stereoscopic images 6 generated by the optical instrument and SIAD. In yet another embodiment, the system may include an image processing unit 7 (IPU). In another embodiment, the system may include a battery or other power source 13 to provide power to the system. Further embodiments may contain no SIAD but may contain other components to perform similar functions.

The image processing unit 7 as well as the display 6 and a battery 13 (to provide power) may be attached to the device and integrated into a housing, resulting in a complete, integrated, one-piece device that provides all the necessary functionality including: mechanisms for (1) forming a stereoscopic electronic image of an object or location, (2) processing such image data and (3) displaying a magnified, unmagnified, or demagnified stereoscopic image of the object or location, in a desired orientation and condition (e.g. not inverted or reflected, or in any orientation desired by the user), in a convenient position on the stereoscopic display for the viewer, in real time, and in a device which could be portable.

In other embodiments, some or all of the functions of the IPU can be built into circuitry, firmware and software inside the SIAD or elsewhere in the system, such that a separate IPU component may not be required, possibly reducing the size and cost of the system. In yet other embodiments, the one-piece device could be handheld in its use. In further embodiments, the display could be mounted separately with a tethering data cable or wireless link to the SIAD or IPU.

In one embodiment, the display could be mounted to the user, facing the user's view, such that his hands can be free to steer and operate the device or perform other tasks while observing the image on the display. An additional advantage of such a system is that the user can possibly see the displayed image at the same time as his peripheral vision allows him to see the rest of the location or surroundings, or vice-versa. Additionally. the system could have the display mounted directly on a handheld device that may be the SIAD, to accomplish a similar result. In these or other embodiments the display, or one or more additional displays connected via a "splitter" device, could be mounted such that multiple viewers could see the displayed image.

Image Processing

Image processing could be performed on the data to reduce the perceived effect of camera shake on the viewed stereoscopic image. Time sequential data from both left and right channels in combination could be used to calculate corrections of the data to negate the shake effect of both channels, providing image stabilization for the entire stereoscopic image for example, or to otherwise cause a desired effect. Because the electronic corrections can be calculated knowing the kinematic relationship between the optical axes and because the data from the sensors is synchronized with each other the proper corrections can be applied to the stereoscopic image. This is advantageous as compared to the prior art, which applied the corrections to the views separately and asynchronously, resulting in spurious parallax of the stereoscopic image. Alternatively the corrections could be applied to one or more actuation mechanisms to alter the optical path or paths, such that the image is corrected when it arrives at the sensor.

Data from both left and right channels could be used to calculate corrections to the sensor exposure parameters or corrections to the data itself to optimize the stereoscopic image and to balance the left channel with the right, providing simultaneous exposure or gain control for example. One embodiment of this could involve a simultaneous baseline setting of the two channels to give equal image characteristics, for example performing white balance simultaneously.

Image processing to compress or encode the data could be done to the single data stream or to one or both streams prior to their combination.

Displays

In these and other embodiments of the current invention, the stereoscopic display could be of any type as described in the related U.S. Patent Application Ser. Nos. 60/762,577, 60/833,117, 11/256,497 and 11/881,617 that can be further applicable to embodiments of this invention. In embodiments where the user looks slightly downward to see the display but looks up over the display to see the location or object being imaged, and where the display is of a type requiring the user to wear spectacles to see the image stereoscopically, it could be advantageous for the spectacles to be constructed like "reading glasses" whereby looking over the active portion of such spectacles the user has an unobstructed view of the location. Alternatively, left—right stick-on films made from polarizers, retarders or other materials required for stereoscopic viewing of the 3D display, for viewers wearing other glasses, or polarized sunglasses, could be used. A graphic on the film could indicate proper orientation. A permanent or non-permanent adhering method could be used.

Another embodiment may have a display that could be switched from displaying either left or right or both views. Another embodiment may have a display that presents either or both views together and has no provision for stereopsis.

Storage

In other embodiments one or more Hard Disk Drives (HDD), Digital Video Disks (DVD), solid-state or other similar data storage devices (SD), could be included in the IPU or elsewhere for storage, further processing and playback of images. Because the SIAD inputs, processes and displays images in generally real-time (as observed by a user), the SD interface circuitry could be constructed such that images can be stored essentially instantaneously, with no perceived latency after a start trigger has been activated. This has previously been a problem with digital cameras, whereby a shutter button is pressed but the image is not taken until after a noticeable delay. In some embodiments, the file structure may be split into parallel channels such that the bandwidth of data is split to allow that flowing to each SD to be within the SD's transfer rate. In other embodiments, the storage system could make the actual recording of the images on the SD with a delay from when they are captured in system volatile memory. In yet other embodiments, streaming full-motion stereoscopic image data continuously through the SD system, such that there exists some quantity of image data previously stored, upon the occurrence of an event desirable to be viewed but unanticipated, would allow a viewer to review such previously-stored stereoscopic images to view the event after its occurrence. Stereoscopic image data could be updated continuously or in some other manner to, for example, provide a time-lapse stereoscopic recording of an event that occurs slowly. In embodiments where the stereoscopic image data is a single stream, additional synchronization may be unnecessary, resulting in a simpler system, both in storing images and playing them back. Such a system generally has the same data integrity for both the left and right views of images, as opposed to dual-data-channel systems in which either channel may have defects that could spoil the stereoscopic image. Additionally, such a system could also be made redundant and fail-safe, and this could be done more easily to avoid any image data degradation. Such a system could use SDs that generally have low or no recurring costs associated with re-saving newer image data over old. The SD, or its storage media, could be removable, replaceable or expandable, with power on or off. The SD could be of low power such that it could be included in a battery-operated embodiment. The SD could be of low size and weight such that it could be included in a handheld embodiment. The SD could be of sufficient robustness such that it could be included in an embodiment intended for severe-environments.

Lenses

Lenses or other optical components of the camera and their mounting could be such that interchangeable lenses could be used. Such lenses could be capable of focusing light of infrared, UV or visible wavelengths or combinations thereof. The camera could use two lenses, one for each L/R channel, or a single lens with an optical path switching device such as a shuttering system and beamsplitter or a combination of these. For underwater or similar applications, a system wherein the lenses could contact the water directly and there is a seal for the electronic portion of the SIAD could be used. Furthermore, the internal volume of the sealed portion of the SIAD, possibly including the lenses, could be minimized and securely sealed such that no additional outside housing would be required for use underwater, resulting in a small overall size and weight and easier use. Yet further there could be a tether, thus forming a completely, possibly permanently sealed camera head with a cable, optical fiber or wireless link to the IPU or Display. Such sealing could be potting compound.

The lenses could also be parabolic mirrors to focus directly on the image sensors such as, for example, lenses useful for an IR imaging device with no IR glass optics. Alternatively, lenses could be focused automatically and/or together as described in the referenced patent applications. In addition, the lenses could be small to be mounted closely together to make a small inter-pupillary distance.

Convergence

In embodiments having two optical axes, these axes may be parallel, they may converge at some point distant from the camera or they may be adjustable to converge at any point from a close distance to infinity or to diverge. To allow relative motion of the sensors in embodiments where one or more of the sensors can be moved to move the optical axes, the sensors could be connected to the acquisition controller with flexible circuitry, which may be shielded, to allow relative motion while maintaining bandwidth and suppressing noise.

Convergence could be adjusted by use of a mechanism with an actuator to deflect either or both of the sensors' mounting and their respective lens and axis. Alternatively the mechanism could move an optical element, for example a wedge lens, to deflect one or both axes. The mechanism could be comprised of a hinge or a flexing beam of metal, plastic or other suitable material. The actuator could be a manual screw or motorized leadscrew or cam system, or other mechanical or electromechanical device. The control of the actuator could be designed to be operated by the camera user while shooting. The control could be a knob or switch that could also be a handle for one hand. The control could also be a pistol grip device where the user squeezes or activates a lever or wheel to control convergence adjustment. Adjustable stops or detents in the mechanism could be incorporated to aid the user to achieve their desired convergence effect. Convergence could be automated to the autofocus or other aspects of the camera. The IPU, for example, could be programmed to recognize some moving feature and follow it with convergence. There could be a second flexure or mechanism to adjust the axes to be coplanar, known in the art as vertical alignment.

Embodiments of the camera or camera systems may also contain a convergence mechanism such that the user can change the convergence as the location or object is being observed and/or recorded. In such embodiments the convergence mechanism can be constructed such that it causes a continuous change in convergence, a smooth transition that is without abrupt changes in the views.

The convergence device and system described herein could also be used with two separate cameras and camera systems, for example, without the use of the SIAD.

Inter-Pupillary Distance (IPD)

In some embodiments having two optical axes, it may be desirable to change the distance between the axes as measured at the camera, known in the art as the IPD. This could be done by use of a mechanism such as a beam that moves one sensor and its respective lens and housing away from the other sensor, generally perpendicular to the optical axes, that movement taking place in the plane of the axes. A clamp could be used to manually secure the sensor housing along a beam in the desired location to achieve the desired IPD. Such a beam could also be used to adjust convergence by flexing or deflecting. Alternatively the IPD could be adjusted by use of a mechanism with an actuator to move either or both of the sensors and their respective lens and axis. Such an embodiment could be designed to accommodate interchangeable lenses including without limitation wide angle or telephoto lenses for either or both optical channels.

Zoom

Zoom is known in the art as changing the magnification of an optical channel while a location is being observed. Zooming "in" is generally increasing the magnification and zooming "out" is generally decreasing the magnification. Zooming can be performed manually through the use of a mechanism or automatically by sending an electronic signal to an electromechanical actuator. Either technique causes, for example, changes in the axial spacing between or shape of optical elements. Generally it is desirable to have zooming performed such that abrupt changes in views do not occur.

The mechanism could be geared to drive rotational cam devices that appropriately change the spacing between optical elements, and hence the magnification, in each optical path simultaneously. The mechanism could be mechanical or electromechanical.

Digital zoom is an electronic method to present a similar effect of increasing magnification to a viewer of an electronic display. It is typically implemented by causing a subset of the pixels within the data representing a view to be expanded in order to represent the entire data set representing the view. In this approach, additional pixels are fabricated from adjacent pixel data and interspersed between the original pixels to form a view having generally the same number of pixels as the original view. Alternatively, digital zoom can be implemented by choosing a subset of the pixel cells illuminated by the channel optics on a sensor, to form the data representing the view from the sensor of the channel.

The embodiments of the invention may also contain electronic mechanisms to cause digital zoom to be applied to two channels simultaneously. Alternatively, zooming could be done on a master-slave basis whereby the master view's (the right view in this embodiment) magnification is set as desired, and the slave view's (the left view in this embodiment) zoom is automatically controlled to match the master. Such control could use the image data to calculate the proper control parameters, for example by measuring the number of pixels between certain features common in each L/R view and attempting to equalize them, and could be a function of the IPU or acquisition controller.

The zoom device and system described herein could also be used independently with two separate cameras and camera systems, for example, without the use of the SIAD.

Controls

In some embodiments the controls and functions could enable the device to be operated by a single person, remotely or automatically. Control of one or more of the system's functions could be achieved through one or more separate user interface devices used in combination, including without limitation, pushbuttons or other switching devices, a touchpad screen (separate or attached or a part of the 3D display), a joystick, pistol-grip control device, wheel, lever, mouse or similar device controlling the system that provides user feedback on the 3D display screen or on another screen or output indication device. Such user interface and feedback could be stereoscopic to enhance effectiveness. Such controls could operate remotely from the device via a wireless link or over an interface.

Communication

Communication, including transmittal of image data, and additional control of a system of these embodiments could be performed thru an external interface, including without limitation a network, USB, "firewire", cameralink or custom designed interface or port, to other devices or to a network.

Measurements

Capture of the stereoscopic image data could include the capability to make measurements in three dimensions, x-y-z, z being into/out of the image plane, using the parallax data between left/right views of any point common to both views, to calculate the z dimension. Furthermore, it may be desirable to calculate the location of points with respect to a coordinate system. An embodiment could include a component for determining the location of the stereoscopic camera with respect to the desired coordinate system, for example a GPS receiver, whereby the coordinate system is earth's latitude, longitude and altitude. In addition the embodiment could include a component for determining the direction of the z dimension with respect to the coordinate system, for example an electronic compass and/or an azimuth indicator. The location of points in the stereoscopic image can then be calculated with respect to the coordinate system. Quantization error of such a system could be reduced by networking more than one system viewing the desired points from different camera locations and averaging their calculated locations of the desired points.

An embodiment could include a pan-tilt-zoom mechanism and such mechanism could be equipped with, for example, position indication devices such that the direction of the z dimension could be changed and the new direction calculated with respect to the desired coordinate system.

Deflecting Element

FIG. 3 illustrates one embodiment of the Stereoscopic Camera and System containing a deflecting element, system components, and a viewer. The components are labeled as outlined below:

1. Object in a location being imaged;
2. Optical axes;
4. Stereoscopic Image Acquisition Device;
5. Optical instrument, in this embodiment is a binocular with two telescopes;
6. Stereoscopic display, in this embodiment an autostereoscopic flat panel.
8. Viewer, in approximate viewing position in this embodiment to see 3D image;
9. Image of object in location, appearing 3D to the viewer;
14. Deflecting element, in this embodiment a flat mirror, mounting not shown; and 15a-15c. Wall (15a) between harsh environment (15b) and non-harsh environment (15c); wall is shown in cutaway.

16. Pan-tilt-zoom mechanism for changing the direction and/or magnification of the camera.

In this embodiment, a deflecting element 14 can be placed in the optical path 2 between the object being imaged 1 and the input optical component of the optical instrument 5. A system with a deflecting element 14 could be used, as a nonlimiting example, to see around corners or to protect the camera or camera system by exposing only the deflecting element 14 to an environment unsuitable for the camera 15b while keeping most of the system in a safe environment 15c, protected from the unsafe environment 15b by, for example, a suitable type of wall 15a. Electronic mechanisms can be utilized to de-reflect the views or the stereoscopic image such that the viewer 8 observes an image 9 of the location or object as if it was not reflected by the deflecting element. Alternatively, the deflecting element can be adjusted to provide other desirable orientation.

The embodiments and examples set forth herein, including the best mode known to the inventor for carrying out the invention, were presented in order to best explain embodiments of the present invention and its practical application and to thereby enable those of ordinary skill in the art to make and use embodiments of the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Furthermore, embodiments of the present invention are also applicable to many other types of optical instruments

I claim:

1. A stereoscopic camera comprising:
    (a) at least one optical instrument comprising a first and a second channel, wherein the channels are capable of illuminating pixel cells of at least one image sensor configured to generate pixel data;
    (b) a first and a second optical path corresponding respectively to the first and the second channel and having a first and a second respective optical axes, wherein the first and the second optical paths are configured to provide a first and a second respective view of a first stereoscopic image of a location to the pixel cells of the at least one image sensor, and the first and second respective views correspond to a first left view and a first right view of the first stereoscopic image;
    (c) at least one convergence mechanism configured to adjust at least one of the first and the second respective optical axes of the respective optical paths, thereby aligning a vergence of the axes to coincide at a first desired point within the location;
    (d) at least one focus mechanism configured to adjust the focus of at least one of the first and the second respective optical channels, thereby focusing the channels at a second desired point within the location;
    (e) at least one magnification mechanism configured to adjust the magnification of at least one of the first and the second respective channels; and
    (f) an acquisition controller configured to acquire from the at least one image sensor at least one pixel data for each view corresponding to the first left view and the first right view of the first stereoscopic image wherein the at least one pixel data corresponding to the left view is simultaneously generated with the at least one pixel data corresponding to the respective right view, and transmit the pixel data in real time.

2. The stereoscopic camera of claim 1 wherein the acquisition controller is further configured to acquire pixel data corresponding to at least one subsequent left view and respective right view of at least one subsequent stereoscopic image following adjustment of at least one of the at least one convergence mechanism, the at least one focus mechanism, and the at least one magnification mechanism.

3. The stereoscopic camera of claim 2 wherein one of the at least one subsequent stereoscopic image is identical to the first stereoscopic image.

4. The stereoscopic camera of claim 2 further comprising a display controller communicatively coupled to the acquisition controller and configured to process the pixel data corresponding to the first left view and the first right view of the first stereoscopic image into display signals and transmit the display signals to a stereoscopic display.

5. The stereoscopic camera of claim 4, further comprising a user input device wherein the adjusting is responsive to input from a user upon observation of at least one of the first left view and the first right view of the first stereoscopic image.

6. The stereoscopic camera of claim 1 wherein the at least one optical instrument comprises a microscope comprising a main objective.

7. The stereoscopic camera of claim 6 wherein the at least one convergence mechanism configured to adjust at least one of the optical axes further comprises a mechanism to change the focal length of the main objective.

8. The stereoscopic camera of claim 7 wherein the first desired point and the second desired point within the location are the same point.

9. The stereoscopic camera of claim 8 wherein the at least one focus mechanism is further configured to automatically adjust focus after relative motion of the same point with respect to the camera.

10. The stereoscopic camera of claim 1, further comprising a storage device configured to receive the pixel data.

11. The stereoscopic camera of claim 1 wherein the first desired point is at a distance of infinity.

12. A stereoscopic camera comprising:
    (a) at least one optical instrument comprising a first and a second channel, the channels comprising a first and a second optical axis, wherein the at least one optical instrument is configured to provide a plurality of optical views corresponding to a first left view and a first right view of a first stereoscopic image of a location to at least one image sensor comprising pixel cells, and each axis comprises a proximal end positioned at the approximate center of an array of pixel cells of the at least one image sensor corresponding to its respective first view;
    (b) a convergence device for setting the first and the second respective optical axes of each respective optical channel thereby aligning a vergence of the distal intersection of the first and second respective optical axes to coincide at a first desired distance in the location;
    (c) an acquisition controller configured to acquire, from the at least one sensor, pixel data representative of each first view of the plurality of optical views wherein the first stereoscopic image has a first resolution;
    (d) an image processing unit communicatively coupled to the acquisition controller and configured to:

i. receive the pixel data representative of each first view of the plurality of optical views of the first stereoscopic image of the location at the first resolution;
ii. choose a first subset of the pixel cells representative of at least a portion of the first left view and a respective second subset of the pixel cells representative of at least a portion of the first right view;
iii. receive pixel data corresponding to each subset wherein the pixel data corresponding to the first and second subsets comprise respective second left and second right views of a second stereoscopic image of the location; and
iv. output the pixel data corresponding to each subset.

13. The stereoscopic camera of claim 12 wherein the image processing unit is further configured to generate pixel data corresponding to third left and third right views of a third stereoscopic image of the location by interspersing additional pixel data representing additional pixels between the pixel data representing pixel cells of the first and second subsets, wherein the additional pixel data is fabricated responsive to adjacent pixel data corresponding to the first and second subsets, and the third stereoscopic image comprises the first resolution.

14. The stereoscopic camera of claim 13 further comprising a display communicatively coupled to the image processing unit, the display configured to display the third left and third right views as the third stereoscopic image.

15. The stereoscopic camera of claim 14 wherein the proximal ends of the respective first and second optical axes lie outside the approximate centers of the displayed third left and third right views of the third stereoscopic image.

16. The stereoscopic camera of claim 15 wherein the third stereoscopic image is representative of a magnification of at least a portion of the first stereoscopic image.

17. The stereoscopic camera of claim 12 wherein the image processing unit is further configured to allow a user to choose at least one of the first and second subsets of the pixel cells.

18. The stereoscopic camera of claim 17 wherein the image processing unit is further configured to automatically choose a corresponding respective subset of pixel cells following the user's choice of one of the at least one of the first and second subsets of pixel cells.

19. The stereoscopic camera of claim 18 wherein the automatic choice of the corresponding respective subset is made to minimize spurious vertical parallax.

20. The stereoscopic camera of claim 12, further comprising a storage device configured to receive the pixel data.

21. A stereoscopic camera system comprising:
(a) at least one optical instrument comprising a first and a second channel, the channels comprising a first and a second optical axis, wherein the at least one optical instrument is configured to provide a plurality of optical views corresponding to a first left view and a first right view of a first stereoscopic image of a location to at least one image sensor comprising pixel cells, and each axis comprises a proximal end positioned at the approximate center of an array of pixel cells of the at least one image sensor corresponding to its respective view;
(b) a convergence device for setting at least one of the first and the second respective optical axes of each respective optical channel thereby aligning a vergence of the distal intersection of the first and second respective optical axes to coincide at a first desired distance;
(c) an acquisition controller configured to acquire, from the at least one sensor, pixel data representative of each view of the plurality of optical views of the first stereoscopic image;
(d) a display system communicatively coupled to the acquisition controller and configured to display to a viewer the plurality of optical views as the first stereoscopic image;
(e) a Z dimension wherein the direction of the Z dimension is from the camera through the vergence of the optical axes as perceived by the viewer to be orthogonal to the display of the first stereoscopic image;
(f) a coordinate system fixed with respect to the location;
(g) a positioning system configured to determine the position of the camera and the direction of the Z dimension with respect to the coordinate system.

22. The stereoscopic camera system of claim 21 further comprising an image processor communicatively coupled to the acquisition controller, configured to measure the parallax between the views of a point in the stereoscopic image of the location, wherein the point is common to both views, and triangulate the distance in the Z direction between the point and the first desired distance.

23. The stereoscopic camera system of claim 21 wherein the positioning system comprises an electronic compass.

24. The stereoscopic camera system of claim 22 further comprising a pan-tilt-zoom mechanism comprising devices for indicating the position and direction of the Z dimension with respect to the coordinate system.

25. The stereoscopic camera system of claim 21 wherein the at least one optical instrument is a stereomicroscope and the location is a surgical site of a patient.

* * * * *